(12) United States Patent
Zhong et al.

(10) Patent No.: US 11,321,392 B2
(45) Date of Patent: May 3, 2022

(54) LIGHT WEIGHT INDEX FOR QUERYING LOW-FREQUENCY DATA IN A BIG DATA ENVIRONMENT

(71) Applicant: International Business Machines Corporation, Armonk, NY (US)

(72) Inventors: Jia Tian Zhong, Beijing (CN); Bin Yang, Beijing (CN); Shuang H. Wang, Beijing (CN); Xing Xing Shen, Beijing (CN); Qi Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/279,695

(22) Filed: Feb. 19, 2019

(65) Prior Publication Data
US 2020/0265086 A1 Aug. 20, 2020

(51) Int. Cl.
*G06F 16/901* (2019.01)
*G06F 16/903* (2019.01)

(52) U.S. Cl.
CPC ...... *G06F 16/901* (2019.01); *G06F 16/90335* (2019.01)

(58) Field of Classification Search
CPC .. G06F 16/901; G06F 16/22; G06F 16/90335; G06F 16/951; G06F 16/245
USPC ........................................................ 707/736
See application file for complete search history.

(56) References Cited

U.S. PATENT DOCUMENTS

| | | | |
|---|---|---|---|
| 6,122,626 A | 9/2000 | Brandsma | |
| 8,566,333 B2 | 10/2013 | Muras | |
| 9,129,037 B2 | 9/2015 | Egan et al. | |
| 9,996,561 B1* | 6/2018 | Barsness | G06F 16/21 |
| 2004/0236727 A1 | 11/2004 | Day et al. | |
| 2007/0280263 A1* | 12/2007 | Chen | H04L 61/6022 370/395.31 |
| 2010/0005054 A1* | 1/2010 | Smith | G06F 16/2456 707/E17.002 |
| 2011/0246449 A1* | 10/2011 | Collins | G06F 16/24542 707/715 |

(Continued)

FOREIGN PATENT DOCUMENTS

WO 2015106711 A1 7/2015

OTHER PUBLICATIONS

Sheng Wang, David Maier, Beng Chin Ooi, "Lightweight Indexing of Observational Data in Log-Structured Storage," Proceedings of the VLDB Endowment, vol. 7, No. 7, Sep. 1-5, 2014, Hangzhou, China.

(Continued)

*Primary Examiner* — Hosain T Alam
*Assistant Examiner* — Nicholas E Allen
(74) *Attorney, Agent, or Firm* — Patterson + Sheridan, LLP

(57) ABSTRACT

The present disclosure relates to searching for and committing low-frequency data to a database. An example method generally includes receiving, from a requesting application, a query for data from the data repository. A database system retrieves a set of indices associated with the data specified in the query from an index table in the data repository. Upon determining that the set of indices comprises a non-null set, the database system retrieves records associated with each index in the set of indices from a data table associated with the index table and returns the retrieved records to the requesting application.

20 Claims, 6 Drawing Sheets

(56) References Cited

U.S. PATENT DOCUMENTS

| | | | | |
|---|---|---|---|---|
| 2011/0258225 | A1* | 10/2011 | Taylor | G06F 16/2272 |
| | | | | 707/769 |
| 2013/0060783 | A1* | 3/2013 | Baum | G06F 16/2272 |
| | | | | 707/746 |
| 2013/0091120 | A1* | 4/2013 | Ganjam | G06F 16/2458 |
| | | | | 707/714 |
| 2013/0124500 | A1* | 5/2013 | Beavin | G06F 16/24534 |
| | | | | 707/714 |
| 2014/0095472 | A1* | 4/2014 | Lee | G06F 16/24542 |
| | | | | 707/714 |
| 2014/0122452 | A1* | 5/2014 | Faerber | G06F 16/221 |
| | | | | 707/693 |
| 2014/0278754 | A1* | 9/2014 | Cronin | G06F 16/2453 |
| | | | | 705/7.29 |
| 2015/0213035 | A1* | 7/2015 | Collins | G06F 16/28 |
| | | | | 707/711 |
| 2015/0370840 | A1 | 12/2015 | Wilhelm et al. | |
| 2016/0299944 | A1* | 10/2016 | Isaacson | G06F 16/2453 |
| 2016/0342657 | A1* | 11/2016 | Pike | G06F 11/1482 |
| 2017/0103125 | A1* | 4/2017 | Sapkota | G06F 16/3322 |
| 2017/0308621 | A1 | 10/2017 | Wu et al. | |
| 2017/0344588 | A1* | 11/2017 | Horowitz | G06F 16/2228 |
| 2018/0032558 | A1* | 2/2018 | Oliner | G06F 16/43 |
| 2018/0089306 | A1* | 3/2018 | Pal | G06F 16/3349 |

OTHER PUBLICATIONS

Mark Lillibridge, Kave Eshghi, Deepavali Bhagwat, Vinay Deolalikar, Greg Trezise, Peter Camble, "Sparse Indexing: Large Scale, Inline Deduplication Using Sampling and Locality," Proceedings of the 7th conference on File and storage technologies, pp. 111-123, San Francisco, California—Feb. 24-27, 2009.

\* cited by examiner

| Index | Vehicle ID | Timestamp | Location |
|---|---|---|---|
| 100 | A | Date1 0700 | Home address 1 |
| 151 | A | Date1 0810 | Zpark |
| 395 | A | Date1 1800 | Zpark |
| 502 | A | Date1 1900 | Home address 1 |
| ... | ... | ... | ... |
| 1039 | A | Date2 1002 | North gate, Chaoyang Park |

DATA TABLE 410

| Vehicle ID | Time Period | Location | Frequency | Record Index Map |
|---|---|---|---|---|
| A | 0600 | Home address 1 | 312 | |
| A | 0800 | Zpark | 301 | |
| A | 1800 | Zpark | 299 | |
| A | 1800 | Home address 1 | 312 | |
| A | 1000 | North gate, Chaoyang Park | 4 | 1039, 2011, 3017, 8217 |

INDEX DATA TABLE 420

FIGURE 4

LIGHT WEIGHT INDEX FOR QUERYING LOW-FREQUENCY DATA IN A BIG DATA ENVIRONMENT

BACKGROUND

The present disclosure relates to managing data stored in databases, and more specifically, to accelerating retrieval of low-frequency data records in a database.

Databases may be used to store large amounts of data. Due to the amount of data that may be collected and stored in these databases, data tables may grow in size over time. For example, a data table in a database may grow to gigabytes or even terabytes in size. Such a data table may include a large number of individual data records that a user can query and analyze for any number of purposes.

In some cases, a user may be interested in analyzing low-frequency data in a database. For example, in a database system used to track fake license plates on motor vehicles, low-frequency records associated with infrequent appearances of a specific license plate may indicate that the license plate is fraudulent. In another example, in a database system used to monitor and track suspicious financial transactions, the frequency with which a person transfers funds to a specific recipient may be used to flag transactions with infrequent recipients as a suspicious transfer.

The time needed to process a query for such low-frequency data may vary based on the size of the database or a specific data table identified in the query. While querying for data in a small data table may be a computationally inexpensive process, the computational expense and time needed to process such a query may increase as the size of the data table(s) identified in the query increases. In environments where low-frequency data is queried and analyzed regularly, the processing time associated with a query to retrieve such low-frequency time may impede analysis processes on such data and, potentially, impede an ability to take action with respect to such low-frequency data (e.g., block a transaction from occurring).

SUMMARY

One embodiment disclosed herein includes a method for querying for data in a data repository. The method generally includes receiving, from a requesting application, a query for data from the data repository. A database system retrieves a set of indices associated with the data specified in the query from an index table in the data repository. Upon determining that the set of indices comprises a non-null set, the database system retrieves records associated with each index in the set of indices from a data table associated with the index table and returns the retrieved records to the requesting application.

Another embodiment includes a processor and a memory having instructions stored thereon which, when executed on the processor, performs an operation for querying for data in a data repository. The operation generally includes receiving, from a requesting application, a query for data from the data repository. A database system retrieves a set of indices associated with the data specified in the query from an index table in the data repository. Upon determining that the set of indices comprises a non-null set, the database system retrieves records associated with each index in the set of indices from a data table associated with the index table and returns the retrieved records to the requesting application.

Still another embodiment includes a computer-readable storage medium having instructions stored thereon, which, when executed on a processor, performs an operation for querying for data in a data repository. The operation generally includes receiving, from a requesting application, a query for data from the data repository. A database system retrieves a set of indices associated with the data specified in the query from an index table in the data repository. Upon determining that the set of indices comprises a non-null set, the database system retrieves records associated with each index in the set of indices from a data table associated with the index table and returns the retrieved records to the requesting application.

BRIEF DESCRIPTION OF THE SEVERAL VIEWS OF THE DRAWINGS

FIG. 4 illustrates an example data table and associated index data table for low-frequency data in the data table, according to one embodiment.

DETAILED DESCRIPTION

Embodiments presented herein describe techniques for managing low-frequency data in database systems to facilitate rapid retrieval of low-frequency data from a data table. As described herein, a data table may be associated with an index data table that maintains information about distinct sets of data stored in the data table. The index data table may be considered, in some embodiments, to be a sparse index which includes a null set for data that appears frequently in the data table and sets of record identifiers associated with data that appears infrequently in the data table. When a database system receives a request to retrieve data from the data table, the database system can extract search criteria from the received request and examine the index data table to determine if the search criteria specifies that a user is requesting low-frequency data from the data table. If the user is requesting low-frequency data from the data table, the database system can use the set of indices associated with the low-frequency data and stored in the index data table to obtain records identified by the set of indices from the data table without performing a search on the data table itself. If, however, the search criteria specifies that the user is not requesting low-frequency data from the data table, the database system may execute the query against the data table to obtain the requested data.

By maintaining an index data table for low-frequency records in a database, aspects of the present disclosure may improve the performance of data retrieval operations in databases storing large amounts of data. To retrieve low-frequency data from a data table, a database system, need not execute a search against large data sets (e.g., millions or even billions of records) to obtain a small number of records of interest. Rather, a database system can directly retrieve a specific set of records from a data table using the indices associated with a requested item of low-frequency data, which may accelerate the process of retrieving and returning such data to a requesting application and lower resource utilization at a database system by bypassing computationally expensive search operations against large data sets.

Figure 1:
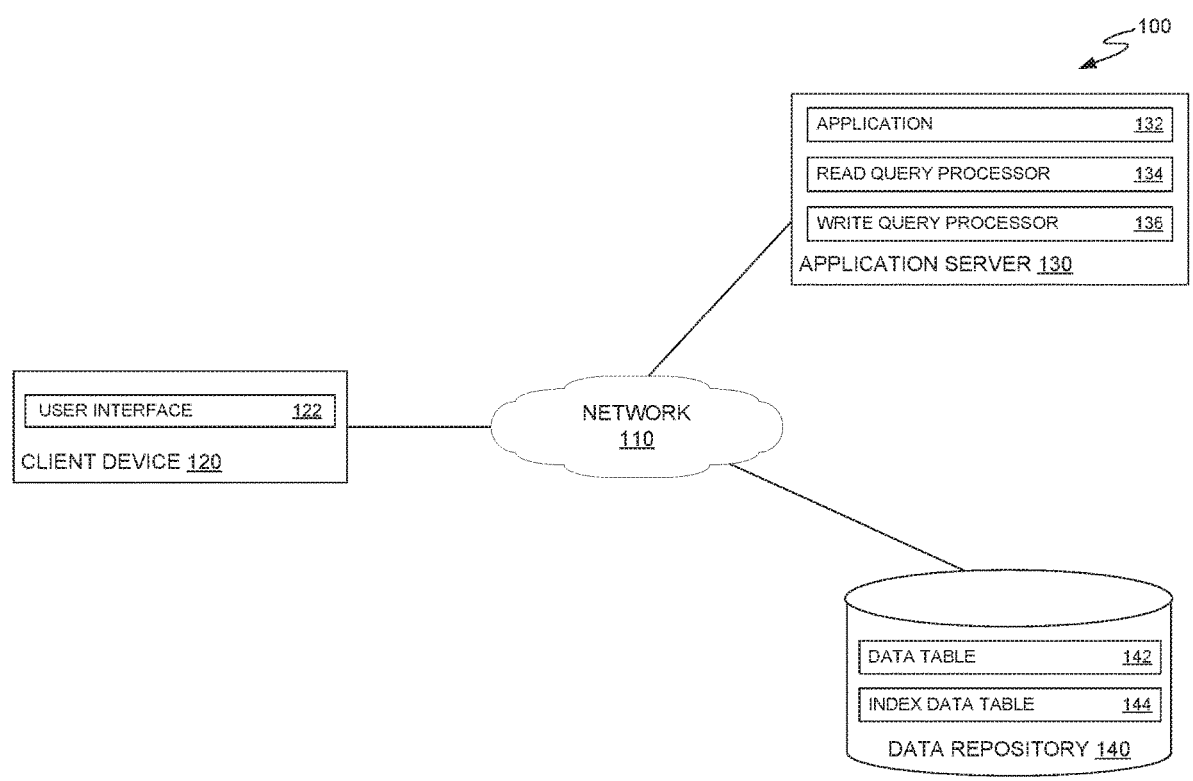
FIG. 1 illustrates an example networked environment in which a database system maintains an index table for low-frequency data, according to one embodiment.

FIG. 1 illustrates an example networked computing environment in which a database system processes queries based on information maintained in an index data table for low-frequency data in the database, according to an embodiment of the present disclosure. As illustrated, computing environment 100 includes a client device 120, an application server 130, and a data repository 140.

Client device 120 generally is representative of a computing device on which a user can initiate a search for data stored in a data table 142 at data repository 140 and/or commit data to data table 142 at data repository 140. Client device 120 may be, for example, a laptop computer, a desktop computer, a thin client, a tablet computer, a mobile computing device, and the like. As illustrated, client device 120 includes a user interface 122. User interface 122 allows a user of client device 120 to interact with an application that uses data from data repository 140 to request and/or commit data to data repository 140. In some embodiments, user interface 122 may display a text editing interface or other graphical interface that allows a user to specify data to retrieve from data table 142 at data repository 140 and/or data to commit to data table 142 at data repository 140. In some embodiments, user interface 122 may additionally expose a file upload mechanism or other batch data processing mechanisms for uploading a file including data to be committed to data table 142 at data repository 140.

While client device 120 as illustrated includes a user interface through which a user can specify data to be retrieved from and/or committed to data repository 140, it should be recognized that client device 120 need not include a user interface to interact with data repository 140. For example, various Internet of Things (IoT) or other connected devices may be connected to data repository 140 (e.g., via application server 130) to commit data, in real time, to data repository 140.

Application server 130 generally receives and processes requests to retrieve data from data repository 140 and/or commit (write) data to data repository 140. As illustrated, application server 130 includes an application 132, a read query processor 134, and a write query processor 136. While application server 130 is illustrated as including application 132, read query processor 134, and write query processor 136, it should be recognized that these components need not reside on the same system.

Application 132 generally exposes features that utilize data stored in data repository 140 to perform one or more actions. For example, application 132 may include traffic monitoring systems, transaction monitoring systems, and other systems that commit data to data repository 140 and consume data from data repository 140 to take some action with respect to the data stored in data repository 140 and/or future activity based on the data stored in data repository 140. In some embodiments, application 132 may receive a request to retrieve specified data from client device 120, generate one or more database read queries based on the received request, and submit the database read queries to read query processor 134 for execution, as discussed in further detail below. Application 132 may also receive requests to commit specified data from client device 120, generate one or more database write queries based on the received request, and submit the database write queries to write query processor 134 for execution. In some embodiments, application 132 can autonomously generate read and write requests based on activity monitored by application 132.

For example, database write requests may be generated by application 132 upon detection of a specified event (e.g., when a camera captures an image of a vehicle passing a particular location, when a transaction is performed to transfer funds from one account to another account, or other activity that application 132 is monitoring). Database read requests may be generated by application 132 upon detecting the occurrence of an event that is unusual or otherwise triggers a procedure for determining whether an event is a suspicious event.

Read query processor 134 generally receives read queries from a client device 120 or application 132 executing on application server 130 and executes the read queries against data table 142 at data repository 140. To execute a read query, read query processor 134 may determine whether the requested data specified in the read query is low-frequency data by searching for the requested data in index data table 144 at data repository 140. To determine whether the requested data specified in the read query is low-frequency data, read query processor can generate a query against index data table 144 to retrieve a set of indices associated with the requested data specified in the read query.

In response to the query executed against the index data table 144, read query processor 134 receives a set of indices associated with the requested data including either a null set (e.g., no indices) or a non-null set identifying records in data table 142 associated with the requested data specified in the read query. If read query processor 134 receives a null set in response to executing the query against the index data table 144, read query processor 134 can determine that that the identified data is not considered low-frequency data. Thus, to satisfy the read query received from client device 120 or application 132, read query processor 134 can execute a query for the requested data against data table 142. The executed query may, for example, be generated as a Structured Query Language (SQL) SELECT query including information specified in the received read query as parameters of the query. In response, read query processor 134 receives the requested data records from data table 142 and returns the retrieved records to the requesting application (e.g., an application executing on client device 120 or executing on application server 130 and displayed on a user interface 122 of client device 120).

If, however, read query processor 134 receives a non-null set of identifiers from index data table 144, read query processor 134 can determine that the requested data is low-frequency data and that a query for the requested data can be more efficiently processed by obtaining specifically identified records from the database. Thus, read query processor 134 can generate and execute a query for records associated with the set of identifiers obtained from index data table 144. The executed query may, for example, be generated as an SQL SELECT query including the set of identifiers associated with the requested data as parameters of the query. In response, read query processor 134 receives the records identified by the set of identifiers from data table 142 and returns the retrieved records to the requesting application.

Write query processor 136 generally is configured to receive requests to commit (or write) data to data table 142 and determine whether to write indices to an associated record in index data table 144 based on whether or not the committed data is low-frequency data. Write query processor 136 may write a record to data table 142 and obtain a record identifier for the written record in response to writing the record to data table 142. To determine whether to write the obtained identifier to the associated record in index data table 144, write query processor 136 may query index data table 144 for the set of identifiers associated with the written data. If the set of identifiers returned from index data table 144 comprises the null set, write query processor 136 may determine (1) that the written record comprises data that has not previously been written to data table 142 or (2) that the written data comprises data that is not considered to be low-frequency data. If the written record in data table 142 comprises data that has not previously been written to data table 142, write query processor 136 can write an index record to index data table 144 including the written data and the index of the written record in data table 142. If the written record in data table 142 comprises data that has previously been written to data table 142 and the set of indices returned from index data table 144 comprises the null set, write query processor 136 can determine that the written record includes data that is not considered to be low-frequency data. Because this data is not considered to be low-frequency data, write query processor 136 need not write the index of the written record to an associated record in index data table 144.

If the set of identifiers returned from index data table 144 contains data other than the null set (e.g., the set of identifiers includes information specifying one or more records in data table 142 associated with the written data), write query processor 136 can determine whether to write the index of the written record to the associated record in index data table 144. Generally, write query processor 136 may add the index of the written record in data table 142 to the associated record in index data table 144. In some cases, however, the addition of the written record to data table 142 may result in the data associated with the written record no longer being considered low-frequency data. To determine whether the committed data is no longer low-frequency data, write query processor 136 can calculate or otherwise determine the number of records including the committed data. For example, if the number of records in data table 142 including the committed data exceeds a threshold number of records or threshold percentage of records, write query processor 136 can determine that the data associated with the written records is no longer considered low-frequency data and delete the set of indices from the associated record in index data table 144.

In some embodiments, the committed data may itself be included in a smaller number of records than a low-frequency data threshold but is also correlated to other data that is not considered to be low-frequency data. Because the committed data is correlated to other data that is not considered to be low-frequency data, write query processor 136 need not write or update a record in index data table 144 associated with the committed data. Committed data correlated to other data that is not considered to be low-frequency data may be identified, for example, by identifying that the committed data and other data are both associated with a same master record and may be identified dynamically (e.g., during execution of a query) or defined a priori. For example, in a motor vehicle tracking application, a vehicle owner may maintain the vehicle a majority of the time at a primary residence and maintain the vehicle for the remainder of the time at a secondary residence. In isolation, data records including the secondary residence may be considered to be low-frequency data; however, because the primary and secondary residences are correlated (e.g., associated with the same owner) and records including the primary residence may not be low-frequency data, write query processor 136 may determine that records including the secondary residence does not constitute a record that need be monitored. Thus, write query processor 136 need not write a record to or update a record in index data table 144 associated with the secondary address and identifying the index of the written record in data table 142. In another example, in a fraudulent transaction monitoring system, transfers between accounts owned by family members may be infrequent; however, because these accounts are owned by family members, the fraudulent transaction monitoring system may determine that such transfers are not low-frequency data for which a record should be generated in index data table 144.

To track correlations between a given set of data and other data not considered to be low-frequency data, index data table 144 may, in some embodiments, include information linking the set of data to one or more records included in data table 142 that is not considered to be low-frequency data. The information linking sets of data to records in data table 142 may be considered correlation identifiers used to identify a record in the index data table 144 that is correlated with data not considered to be low-frequency data. When write query processor 136 receives a write request to commit a given set of data to data table 142, write query processor 136 can query index data table 144 for a record including information in the given set of data. If index data table 144 returns a record with a null set of correlation identifiers, write query processor 136 can determine that the given set of data is low-frequency data and is not correlated to other data that is not considered to be low-frequency data. Accordingly, write query processor 136 can update an existing record or generate a new record in index data table 144 for the given set of data, as discussed above. If, however, index data table 144 returns a record that includes a correlation identifier for the given set of data, write query processor 136 need not generate or update a record in index data table 144 identifying the record identifiers in data table 142 at which the given set of data is located.

In some embodiments, write query processor 136 may be configured to process requests to remove one or more data records from data table 142. Write query processor 136 may execute the request to remove the one or more data records from data table 142 (e.g., by executing an SQL DELETE query against data table 142) and determine a number of records remaining in data table 142 including specified data associated with the removed data records. In some embodiments, if the specified data is already considered low-frequency data, write query processor 136 may generate and execute one or more queries to update the set of indices associated with the specified data in index data table 144. In some embodiments, if the specified data is not considered low-frequency data prior to deletion of the one or more data records, write query processor 136 may examine the number of records remaining in data table 142 including the specified data and determine whether the specified data, after deletion of the one or more records, constitutes low-frequency data. The specified data may be considered low-frequency data if, for example, the number of records including the specified data after deletion of the one or more records falls below a threshold number of records or percentage of records in data table 142. If the specified data becomes low-frequency data after deletion of the one or more data records, write query processor 136 may obtain indices of records including the specified data in data table 142 and write the obtained indices to a record associated with the specified data in index data table 144.

In some embodiments, the data stored in data table 142 may be distributed across storage on multiple physical or virtual machines. To maintain the correct information in a record in index data table 144, write query processor 136 may write indices to the record in a manner that identifies the physical or virtual machine on which a record including a specified piece of data is located and a location in a table stored on the identified machine at which the record is located. In some embodiments, where data table 142 is stored as a file stream or other unstructured file on a physical or virtual machine, the written indices in index data table 144 may include information identifying a file location of data table 142 and an offset at which the record may be found.

Data repository 140 generally provides an updateable repository in which data records and an index data for accelerating access to low-frequency data in the data repository 140 is located. As illustrated, data repository 140 includes data table 142 and index data table 144. Data table 142 generally includes all of the records written to a database associated with a particular application 132. As discussed, index data table 144 includes a plurality of records, where each record in index data table 144 identifies a unique set of data stored in data table 142. If the set of indices includes the null set, the unique set of data may not be considered low-frequency data. If, however, the set of indices includes one or more record identifiers, the unique set of data associated with the set of indices may be considered low-frequency data, and read query processor 134 and write query processor 136 may use the set of indices to accelerate data retrieval processes for the unique set of data.

Figure 2:
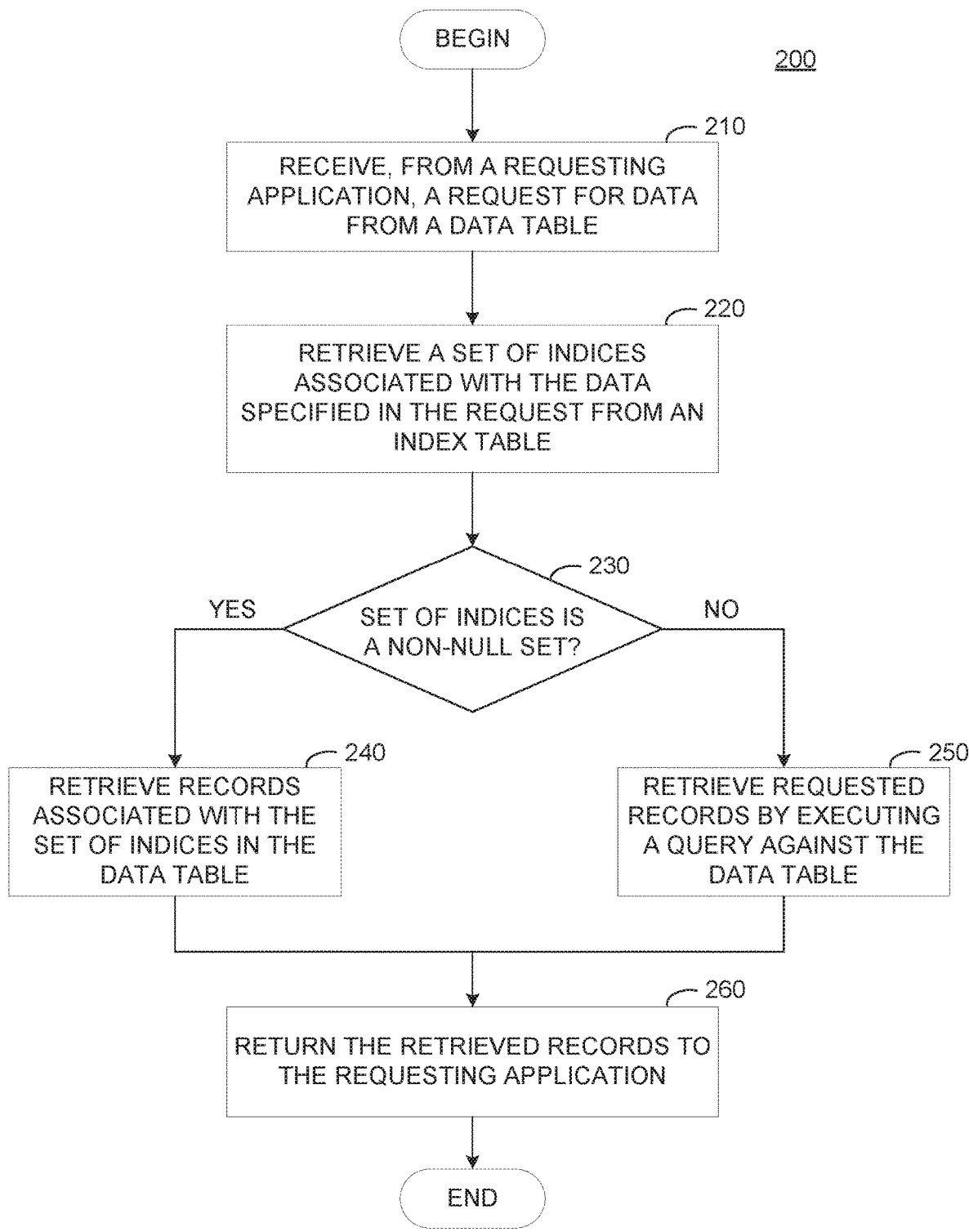
FIG. 2 illustrates example operations for retrieving data from a database system based on record frequency and an index data table for low-frequency data, according to one embodiment.

FIG. 2 illustrates example operations 200 for processing read requests using index data tables for low-frequency data, according to an embodiment.

As illustrated, operations 200 being at block 210, where a read query processor (e.g., read query processor 134 illustrated in FIG. 1) receives, from an application, a request for data from a data table (e.g., data table 142). The request for data may be user initiated (e.g., generated by the user and passed to read query processor 134 via application 132) or automatically generated by an application 132 in response to the detection of one or more trigger events. The request for data from the data table generally specifies information identifying a specific set of data to be retrieved from data table 142.

At block 220, read query processor 134 retrieves, from an index data table 144, a set of indices associated with the data specified in the request. As discussed, the set of indices associated with the data specified in the request may comprise a null set, indicating that the specified data is not considered low-frequency data, or a non-null set, indicating that the specified data is considered low-frequency data. To retrieve the set of indices from index data table 144, read query processor 134 can request an index record from index data table 144 using the specified data as parameters of the request.

At block 230, read query processor 134 determines whether the set of indices comprises a non-null set. If, at block 230, read query processor 134 determines that the set of indices is a non-null set, read query processor 134 can determine that the data specified in the request is low-frequency data and that obtaining the records including the specified data may entail obtaining specific records from data table 142. Thus, at block 240, read query processor 134 retrieves records associated with the set of indices from data table 142. At block 260, read query processor 134 returns the retrieved records to the requesting application.

If, however, at block 230, read query processor 134 determines that the set of indices is not a non-null set (e.g., the set of indices comprises the null set), read query processor may determine that the data specified in the request is not considered low-frequency data and that obtaining the records including the specified data may entail executing a query against data table 142 including the specified data as parameters of the query.

At block 250, read query processor 134 retrieves the requested records from data table 142 by executing a query against the data table including the requested data as parameters of the query. At block 260, read query processor 134 returns the retrieved records to the requesting application.

Figure 3:
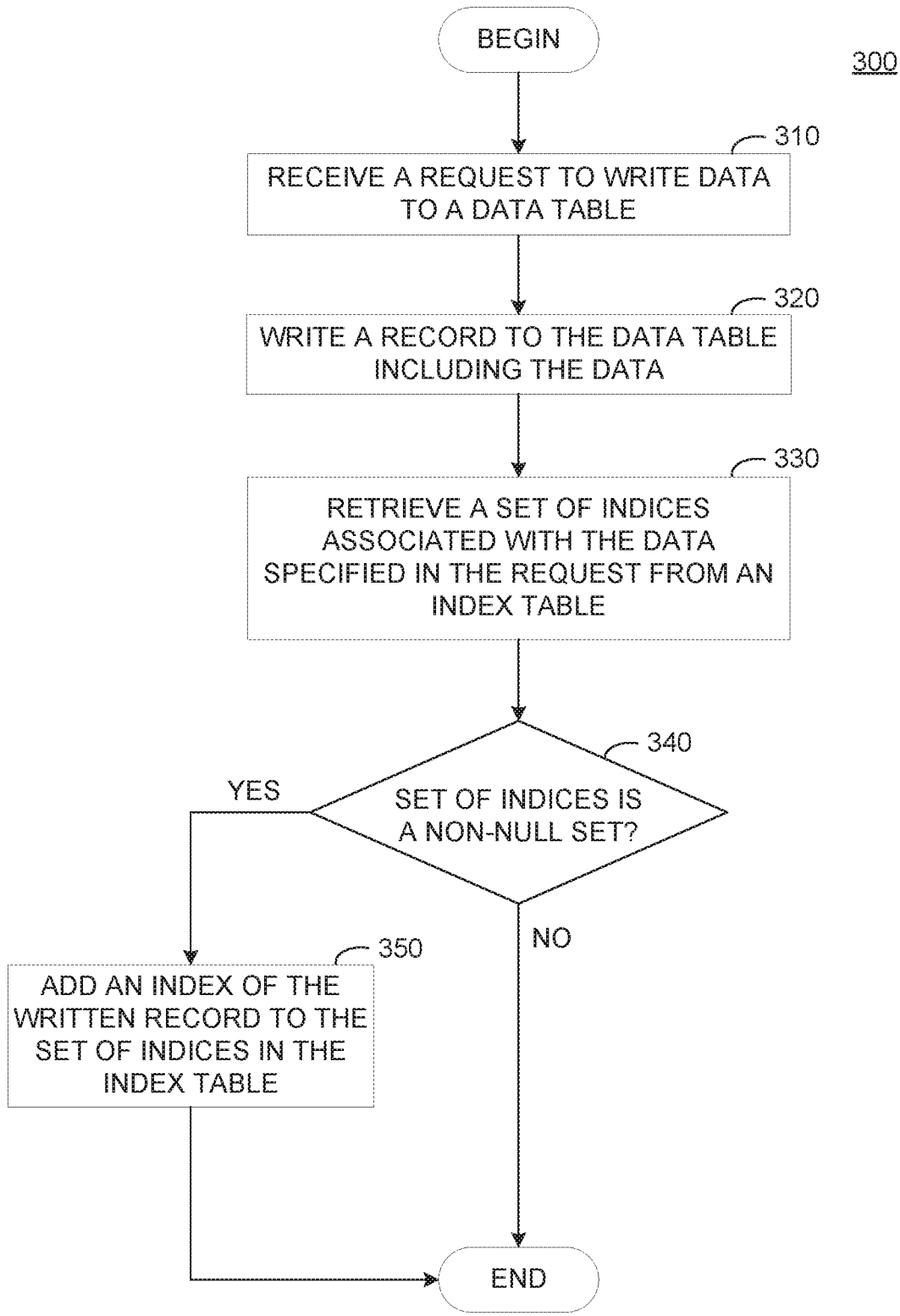
FIG. 3 illustrates example operations for writing data to a database system including an index data table for low-frequency data, according to one embodiment.

FIG. 3 illustrates example operations 300 for executing write queries against a data table and an associated index data table, according to an embodiment. As illustrated, operations 300 begin at block 310, where write query processor 136 receives a request to write data to a data table 142. At block 320, write query processor 136 writes a record to the data table 142 including the data.

At block 330, write query processor 136 retrieves a set of indices associated with the data specified in the request from index data table 144. The set of indices retrieved from index data table 144 may include a null set, indicating that the written data is not considered low-frequency data, or a non-null set, indicating that the written data is considered low-frequency data. Generally, a non-null set of records may not include an index of the record written to data table 142 at block 320.

At block 340, write query processor 136 determines whether the set of indices comprises a non-null set. If the set of indices comprises a non-null set, at block 350, write query processor 136 adds an index of the written record to the set of indices in the index data table associated with the data included in the written record. In some embodiments, as discussed above, write query processor 136 may further determine whether the addition of the written record causes the number of records in data table 142 to exceed a threshold number or percentage of records in data table 142 defining an upper limit to data considered low-frequency data. If the number of records in data table 142, including the record written to data table 142 at block 320, exceeds the threshold number or percentage of records, write query processor 136 can determine that the data is no longer considered low-frequency data and replace the set of indices associated with the data in index data table 144 with the null set.

If, however, at block 340, write query processor 136 determines that the set of indices comprises the null set, write query processor 136 can determine that the written data is not low-frequency data or is otherwise associated with other data that is not low-frequency data. In such a case, write query processor need not write or modify a record in index data table 144 associated with the written data such that the record in index data table 144 associated with the written data remains associated with a null set of indices.

FIG. 4 illustrates an example data table (e.g., data table 142 illustrated in FIG. 1) and associated index data table (e.g., index data table 144 illustrated in FIG. 1) that may be used to accelerate the retrieval of low-frequency data from a database, according to an embodiment. Data table 410 generally includes a plurality of records committed to the database by an application. As illustrated, data table 410 includes records identifying times and locations at which a given vehicle was recorded; however, data table 410 may include any type of data the a user or application may wish to store and analyze, such as financial transaction information, data access logs, and other information.

Each record in data table 410 generally includes an index, which may be automatically assigned to each record when the record is written to data table 410. In some embodiments, the index may monotonically increase as new records are committed to data table 410. In some embodiments, the index may be generated as a unique hash of the data included in a record, a location in a flat file at which a record is located (e.g., an offset from the beginning of the flat file), a globally unique identifier (GUID) generated when the record is written to data table 410 or other information that uniquely identifies a record.

Index data table 420 includes records associated with unique monitored data entries in data table 410. Each record in index data table 420 identifies a total number of records in data table 410 including a specific monitored data entry and a set of indices associated with a specific data entry. Generally, each monitored data entry may be an n-tuple composed of a set of unique data to be monitored in data table 410. As illustrated, index data table 420 includes records identifying a unique three-tuple of vehicle identifier, time period, and vehicle location and associating each three-tuple with the set of indices associated with a specific three-tuple of vehicle identifier, time period, and vehicle location. For vehicle A, three-tuples 422, 424, 426, and 428 are associated with a null set of indices, indicating that the records associated with these three-tuples are not considered low-frequency data. For the three-tuple 430 of {vehicle ID: A, time period: 1000, location: North gate, Chaoyang Park}, the record in index data table 420 indicates that there are four records in data table 410 matching the three-tuple and that these records comprise the set of records with indices 1039, 2011, 3017, and 8217. As discussed above, if an application queries for the data associated with the three-tuple of {vehicle ID: A, time period: 1000, location: North gate, Chaoyang Park} in data table 410, read query processor 134 may obtain records with indices 1039, 2011, 3017, and 8217 from data table 410 without executing a search over the contents of data table 410 for records matching the three-tuple of {vehicle ID: A, time period: 1000, location: North gate, Chaoyang Park}. By doing so, read query processor 134 can accelerate the process of retrieving low-frequency data from data table 410. Further, as new records are added to data table 410, index data table 420 may be updated. For example, if data matching the three-tuple of {vehicle ID: A, time period: 1000, location: North gate, Chaoyang Park} is added to data table 410 a threshold number of times, the set of indices may be removed from the record associated with the three-tuple of {vehicle ID: A, time period: 1000, location: North gate, Chaoyang Park} in index data table 420 to indicate that the data is no longer low-frequency data.

Figure 5:
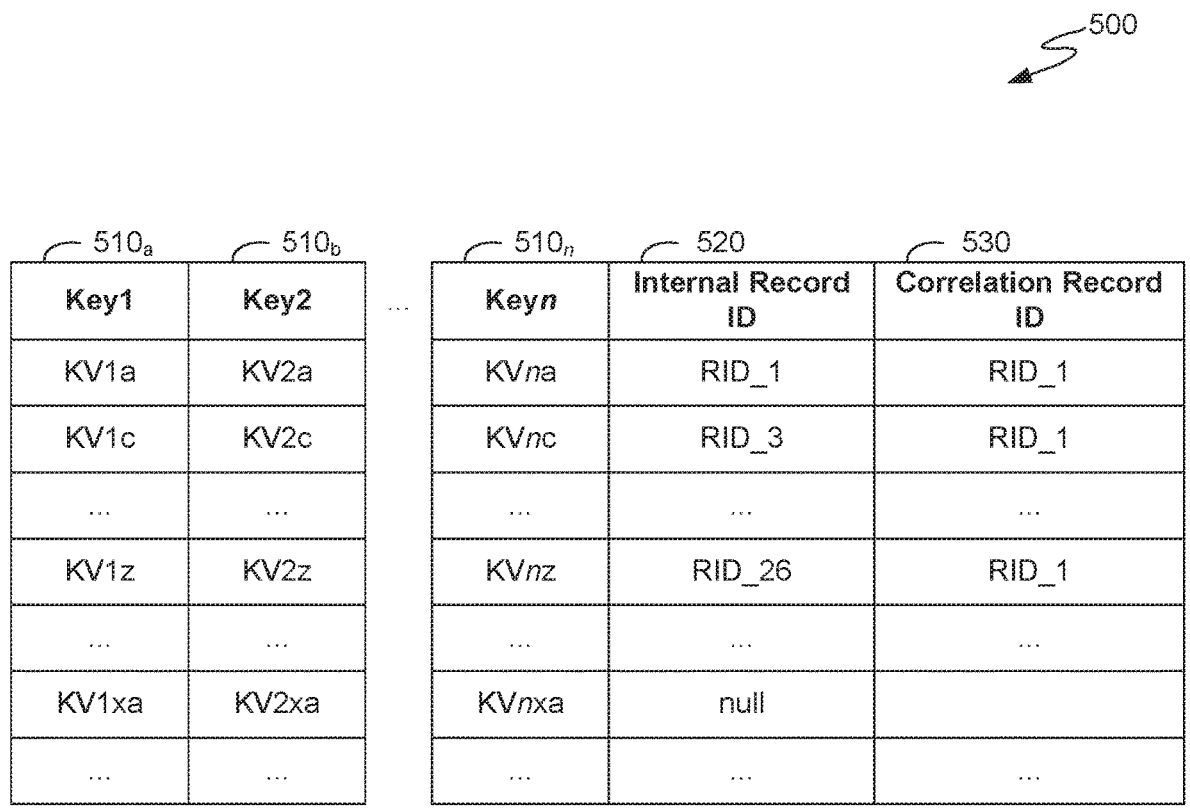
FIG. 5 illustrates an example index data table for low-frequency data including correlation information, according to one embodiment.

FIG. 5 illustrates an example of an index data table (e.g., index data table 144 illustrated in FIG. 1) including correlation information that may be used to accelerate the retrieval of relevant low-frequency data from a database (e.g., low-frequency data that a user may wish to obtain for security purposes, etc.), according to an embodiment. As illustrated, index data table 500 includes a plurality of key value field $510_a$, $510_b$, ..., $510_n$, an internal record ID field 520, and a correlation record ID field 530. Each record may identify a unique set of key value fields $510_a$, ..., $510_n$ and include information in internal record ID field 520 and/or correlation record ID field 530 that a system (e.g., application server 130 illustrated in FIG. 1) can use to determine whether or not data is low-frequency data. In some embodiments, the internal record ID field 520 may include record IDs in data table 142 for data identified by the values in key value fields $510_a$, $510_b$, ..., $510_n$, and the correlation record ID field 530 may include a record ID in data table 142 referencing non-low-frequency data or a record ID for a record in index data table 500 for which a null value exists in internal record ID field 520. In some embodiments, if a record includes a null value in internal record ID field 520, the data identified by the values in key value fields $510_a$, $510_b$, ..., $510_n$ may be data that is not low-frequency data in data table 142. If a record includes a non-null value (or a set of non-null values) in the internal record ID field 520, the data identified by the values in key value fields $510_a$, $510_b$, ..., $510_n$ may be considered low frequency data, and searches for such data may be accelerated using the techniques discussed above. If a record includes a non-null value in the correlation record ID field, the data identified by the values in key value fields $510_a$, $510_b$, ..., $510_n$ may not be considered to be low-frequency data by virtue of a correlation to data that is not low-frequency data.

Figure 6:
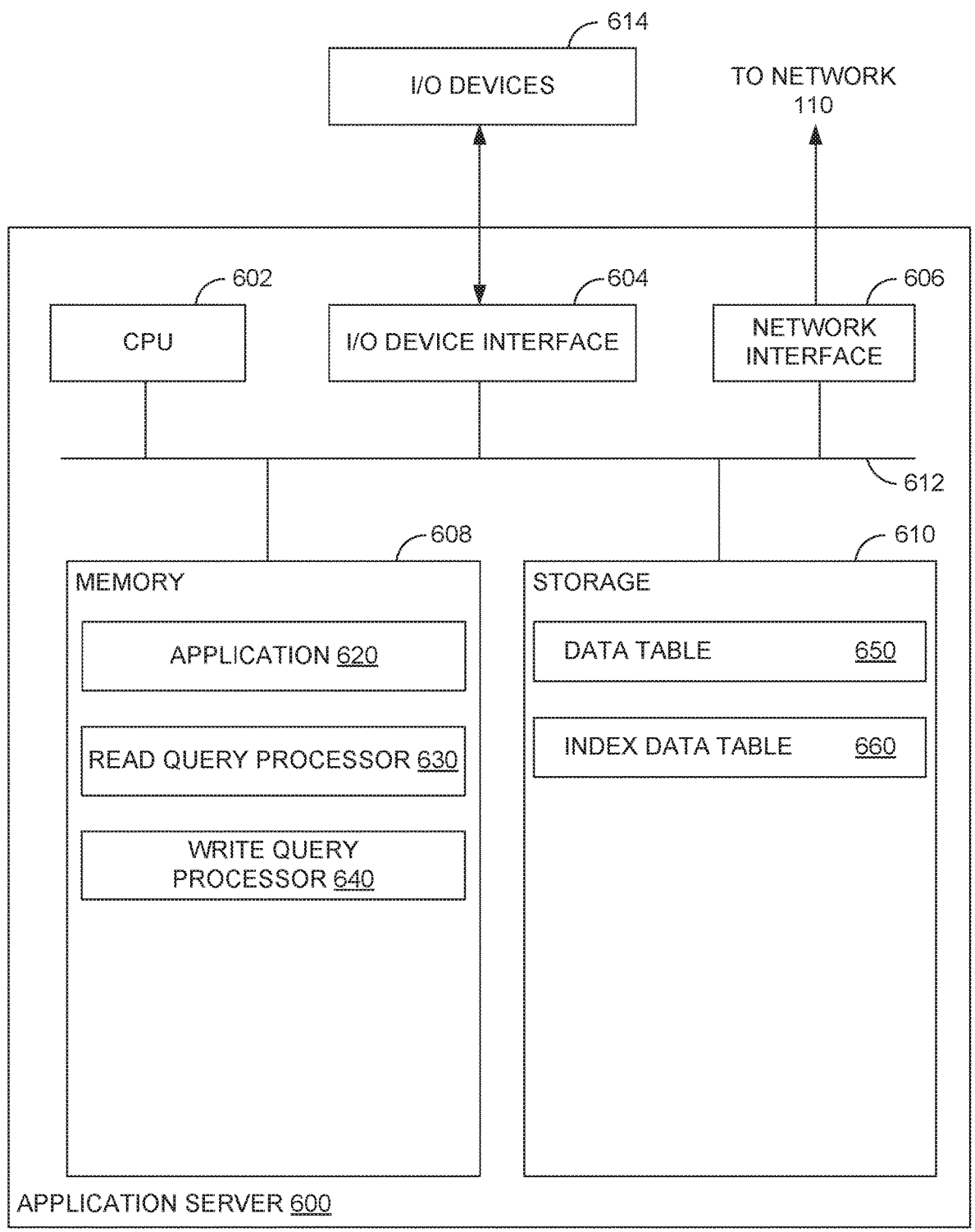
FIG. 6 illustrates an example system in which aspects of the present disclosure may be performed.

FIG. 6 illustrates an example application server 600 that processes queries for data in a data table using an index data table associated with the data table, according to an embodiment. As shown, application server 600 includes, without limitation, a central processing unit (CPU) 602, one or more I/O device interfaces 604, which may allow for the connection of various I/O devices 614 (e.g., keyboards, displays, mouse devices, pen input, etc.) to the application server 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, solid state drives, removable memory cards or optical storage, network attached storage (NAS), or a storage area-network (SAN).

As illustrated, memory 608 includes an application 620, read query processor 630, and write query processor 640. Application 620 is representative of any number of applications that write data to and read data from a data table 650. Application 620 may receive requests to read and write data from a client device via network interface 606 or generate requests to read and write data upon the occurrence of predefined triggering events specific to the application 620.

When application 620 receives or generates a read request, application 620 may provide the received or generated read request to read query processor 630 for execution. Read query processor 630 generally is configured to use sets of indices stored in index data table 660 to determine whether data specified in a read request is low-frequency data and, if so, accelerate retrieval processes for such low-frequency data by obtaining records from data table 650 based on the sets of indices associated with the data specified in the read request in index data table 660. If, however, read query processor 630 receives a null set of indices from index data table 660, read query processor 630 can determine that the requested data is not considered to be low-frequency data (e.g., because the number of records including the requested data in data table 650 exceeds a threshold value or because the requested data is associated with other data in data table 650 having a number of records exceeding the threshold value), read query processor 630 can execute a search query against data table 650 for the requested data.

When application 620 receives or generates a write request, application 620 may provide the received or generated write request to write query processor 640 for execution. Write query processor 640 executes a write request against data table 650 and determines whether to modify an associated record in index data table 660 based on the number of records in data table 650 including data in the written record. If the number of records in data table 650 including data in the written record exceeds a threshold value (e.g., a threshold number of records or a threshold percentage of records in data table 650), write query processor 640 can replace the non-null set of indices in index data table 660 associated with the written data with the null set, indicating that the written data is no longer considered low-frequency data. Otherwise, write query processor 640 may add the index of the written record to the set of indices in index data table 660 associated with the written data.

Storage 610, as illustrated, includes a data table 650 and an index data table 660. Data table 650 generally serves as a repository for data written to a database by application 620. Data table 650 may be stored as a relational database table, a non-relational database table, a flat file, or other appropriate data structure, and each record in data table 650 may be uniquely identified to facilitate rapid retrieval of low-frequency data using these unique identifiers. Index data table 660 generally includes entries for unique n-tuples of data that an application 620 may query from data table 650 and a set of indices associated with each n-tuple of data. n-tuples identifying low-frequency data in data table 650 may be associated with a non-null set of indices identifying specific records including the n-tuple, while n-tuples identifying data not considered low-frequency data in data table 650 may be associated with the null set of indices. As discussed, by storing a non-null set of indices in index data table 660 for low-frequency data, low-frequency data may be retrieved from data table 650 without needing to execute potentially computationally expensive searches on large data sets for a relatively small amount of data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the Application 132 could execute on a computing system in the cloud and perform read requests on a database based on indices included in an index data table and/or perform write requests on a database and maintain entries in the index data table for low-frequency data. In such a case, the Application 132 could perform database transactions and store and maintain information in the index data tables at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for efficiently querying for low-frequency data in a data repository, comprising:
    receiving, from a requesting application, a query for data from a data repository;
    retrieving a set of indices associated with the data specified in the query from an index data table in the data repository, wherein each respective record in the index data table includes at least: (i) a unique set of criteria in a data table in the data repository indexed by the index data table, (ii) an indication of a number of records in the data table having criteria matching the unique set of criteria, and (iii) indices associated with the unique set of criteria, and wherein a non-null value in the set of indices for the respective record indicates that fewer than a threshold number of entries for the unique criteria exist in the data repository indexed by the index data table;

upon determining that the set of indices comprises a non-null set, retrieving records associated with each index in the set of indices from the data table in the data repository indexed by the index data table; and returning the retrieved records to the requesting application.

2. The method of claim 1, further comprising: upon determining that the set of indices comprises a null set, executing the query against the data table.

3. The method of claim 1, further comprising:
receiving a request to write data to the data table, wherein the request includes information associated with a monitored data entry in the data table;
writing a record to the data table including the information;
determining if the information is associated with a second non-null set of indices in the index data table; and
upon determining that the information is associated with the second non-null set of indices in the index data table, adding an index of the written record to the set of indices in the index data table.

4. The method of claim 3, further comprising:
calculating a number of records including the information after writing the record to the data table; and
upon determining that the calculated number of records exceeds a threshold number of records, deleting the set of indices in the index data table associated with the information.

5. The method of claim 4, wherein the threshold number of records is calculated as a percentage of a total number of records in the data table.

6. The method of claim 1, further comprising:
receiving a request to write data to the data table, wherein the request includes information associated with a monitored data field in the data table;
determining that the information is correlated with second information having a null set of indices in the index data table; and
writing the information to the data table without writing an entry associated with the information in the index data table.

7. The method of claim 1, further comprising:
receiving a request to delete a specified record from the data table, wherein the specified record includes information associated with a monitored data field in the data table;
deleting the specified record from the data table;
calculating a number of records including the information after deleting the specified record from the data table; and
upon determining that the calculated number of records is less than a threshold number of records, writing one or more indices of records in the data table including the information associated with the monitored data field to an entry associated with the information in the index data table.

8. The method of claim 1, wherein an index in the set of indices comprises an identifier of a computer system at which an associated record is stored and a location in a table stored on the identified computer system at which the associated record is stored.

9. A system for efficiently querying for low-frequency data in a data repository, comprising:
a processor; and
a memory having instructions stored thereon which, when executed by the processor, performs an operation, the operation comprising:

receiving, from a requesting application, a query for data from a data repository;
retrieving a set of indices associated with the data specified in the query from an index data table in the data repository, wherein each respective record in the index data table includes at least: (i) a unique set of criteria in a data table in the data repository indexed by the index data table, (ii) an indication of a number of records in the data table having criteria matching the unique set of criteria, and (iii) indices associated with the unique set of criteria, and wherein a non-null value in the set of indices for the respective record indicates that fewer than a threshold number of entries for the unique criteria exist in the data repository indexed by the index data table;
upon determining that the set of indices comprises a non-null set, retrieving records associated with each index in the set of indices from the data table in the data repository indexed by the index data table; and
returning the retrieved records to the requesting application.

10. The system of claim 9, wherein the operation further comprises: upon determining that the set of indices comprises a null set, executing the query against the data table.

11. The system of claim 9, wherein the operation further comprises:
receiving a request to write data to the data table, wherein the request includes information associated with a monitored data entry in the data table;
writing a record to the data table including the information;
determining if the information is associated with a second non-null set of indices in the index data table; and
upon determining that the information is associated with the second non-null set of indices in the index data table, adding an index of the written record to the set of indices in the index data table.

12. The system of claim 11, wherein the operation further comprises:
calculating a number of records including the information after writing the record to the data table; and
upon determining that the calculated number of records exceeds a threshold number of records, deleting the set of indices in the index data table associated with the information.

13. The system of claim 9, wherein the operation further comprises:
receiving a request to write data to the data table, wherein the request includes information associated with a monitored data field in the data table;
determining that the information is correlated with second information having a null set of indices in the index data table; and
writing the information to the data table without writing an entry associated with the information in the index data table.

14. The system of claim 9, wherein the operation further comprises:
receiving a request to delete a specified record from the data table, wherein the specified record includes information associated with a monitored data field in the data table;
deleting the specified record from the data table;
calculating a number of records including the information after deleting the specified record from the data table; and upon determining that the calculated number of records is less than a threshold number of records, writing indices of records in the data table including the information associated with the monitored data field to an entry associated with the information in the index data table.

15. The system of claim 9, wherein an index in the set of indices comprises an identifier of a computer system at which an associated record is stored and a location in a table stored on the identified computer system at which the associated record is stored.

16. A computer-readable storage medium having instructions stored thereon which, when executed by a processor, performs an operation for efficiently querying for low-frequency data from a data repository, the operation comprising:
   receiving, from a requesting application, a query for data from a data repository;
   retrieving a set of indices associated with the data specified in the query from an index data table in the data repository, wherein each respective record in the index data table includes at least: (i) a unique set of criteria in a data table in the data repository indexed by the index data table, (ii) an indication of a number of records in the data table having criteria matching the unique set of criteria, and (iii) indices associated with the unique set of criteria, and wherein a non-null value in the set of indices for the respective record indicates that fewer than a threshold number of entries for the unique criteria exist in the data repository indexed by the index data table;
   upon determining that the set of indices comprises a non-null set, retrieving records associated with each index in the set of indices from the data table in the data repository indexed by the index data table; and
   returning the retrieved records to the requesting application.

17. The computer-readable storage medium of claim 16, wherein the operation further comprises: upon determining that the set of indices comprises a null set, executing the query against the data table.

18. The computer-readable storage medium of claim 16, wherein the operation further comprises:
   receiving a request to write data to the data table, wherein the request includes information associated with a monitored data entry in the data table;
   writing a record to the data table including the information;
   determining if the information is associated with a second non-null set of indices in the index data table; and
   upon determining that the information is associated with the second non-null set of indices in the index data table, adding an index of the written record to the set of indices in the index data table.

19. The computer-readable storage medium of claim 18, wherein the operation further comprises:
   calculating a number of records including the information after writing the record to the data table; and
   upon determining that the calculated number of records exceeds a threshold number of records, deleting the set of indices in the index data table associated with the information.

20. The computer-readable storage medium of claim 16, wherein the operation further comprises:
   receiving a request to write data to the data table, wherein the request includes information associated with a monitored data field in the data table;
   determining that the information is correlated with second information having a null set of indices in the index data table; and
   writing the information to the data table without writing an entry associated with the information in the index data table.

* * * * *